United States Patent
Ozawa et al.

(10) Patent No.: US 12,416,902 B2
(45) Date of Patent: Sep. 16, 2025

(54) MEDIUM MANUFACTURING METHOD, MEDIUM MANUFACTURING PARAMETER DETERMINATION METHOD, MEDIUM, AND PROGRAM

(71) Applicant: EPISTRA INC., Tokyo (JP)

(72) Inventors: Yosuke Ozawa, Tokyo (JP); Taku Tsuzuki, Tokyo (JP)

(73) Assignee: Epistra Inc., Tokyo (JP)

( * ) Notice: Subject to any disclaimer, the term of this patent is extended or adjusted under 35 U.S.C. 154(b) by 576 days.

(21) Appl. No.: 17/641,673

(22) PCT Filed: Sep. 13, 2019

(86) PCT No.: PCT/JP2019/036250
§ 371 (c)(1),
(2) Date: Mar. 9, 2022

(87) PCT Pub. No.: WO2021/049044
PCT Pub. Date: Mar. 18, 2021

(65) Prior Publication Data
US 2022/0404782 A1    Dec. 22, 2022

(51) Int. Cl.
G05B 13/04    (2006.01)

(52) U.S. Cl.
CPC ......... *G05B 13/042* (2013.01); *G05B 13/048* (2013.01)

(58) Field of Classification Search
CPC .... G05B 13/042; G05B 13/048; G06Q 10/06; G06Q 50/04; Y02P 90/30
See application file for complete search history.

(56) References Cited

U.S. PATENT DOCUMENTS

| | | | |
|---|---|---|---|
| 7,742,877 | B1 | 6/2010 | Campbell et al. |
| 2015/0010898 | A1 | 1/2015 | Ng |
| 2018/0196913 | A1 | 7/2018 | Yoshikawa et al. |
| 2020/0354666 | A1* | 11/2020 | Downey ............... C12M 41/32 |

FOREIGN PATENT DOCUMENTS

JP    2013-544353 A    12/2013

OTHER PUBLICATIONS

International Search Report issued in corresponding International Application No. PCT/JP2019/036250 mailed Nov. 19, 2019 (4 pages).
Written Opinion issued in corresponding International Application No. PCT/JP2019/036250 mailed Nov. 19, 2019 (3 pages).
International Preliminary Report on Patentability issued in corresponding International Application No. PCT/JP2019/036250 mailed Mar. 15, 2022 (8 pages).

* cited by examiner

*Primary Examiner* — Charles R Kasenge
(74) *Attorney, Agent, or Firm* — Osha Bergman Watanabe & Burton LLP

(57) ABSTRACT

[Problem] To enable a highly effective medium to be manufactured.
[Solution] a manufacturing method of a medium is provided with: a step of creating a prediction model at least based on values of parameters related to manufacturing of another media manufactured in the past and being different in at least any one among an object of culture, an index of the culture, and a manufacturing condition of the medium manufacturing; a step of creating a value of the parameter using the prediction model; and a step of manufacturing the medium using the created value of the parameter.

24 Claims, 5 Drawing Sheets

MEDIUM MANUFACTURING METHOD, MEDIUM MANUFACTURING PARAMETER DETERMINATION METHOD, MEDIUM, AND PROGRAM

TECHNICAL FIELD

The present invention relates to a medium manufacturing method, a medium manufacturing parameter determination method, a medium, and a program.

BACKGROUND ART

PTL 1 has proposed a system that executes and manages laboratory experiments in the life science.

CITATION LIST

Patent Literature

PTL 1 US 2018/0196913

SUMMARY OF INVENTION

Technical Problem

There is a need to maximize the gain at the time of the culture using a medium, however, PTL 1 does not disclose a method of such maximizing.

The present invention has been made in view of such the circumstances, and an object thereof is to provide a technique of manufacturing a highly effective medium.

Solution to Problem

A main invention of the present invention to solve the abovementioned problem is a manufacturing method of a medium that is provided with: a step of creating a prediction model at least based on values of parameters related to manufacturing of another medium manufactured in the past and being different in at least any one among an object of culture, an index of the culture, and a manufacturing condition of the medium manufacturing; a step of creating a value of the parameter using the prediction model; and a step of manufacturing the medium using the created value of the parameter.

Other problems disclosed by the present application and solution methods thereof are made apparent by embodiments of the invention and the drawings.

Advantageous Effects of Invention

With the present invention, it is possible to manufacture a highly effective medium.

DESCRIPTION OF EMBODIMENTS

Overview

Figure 1:
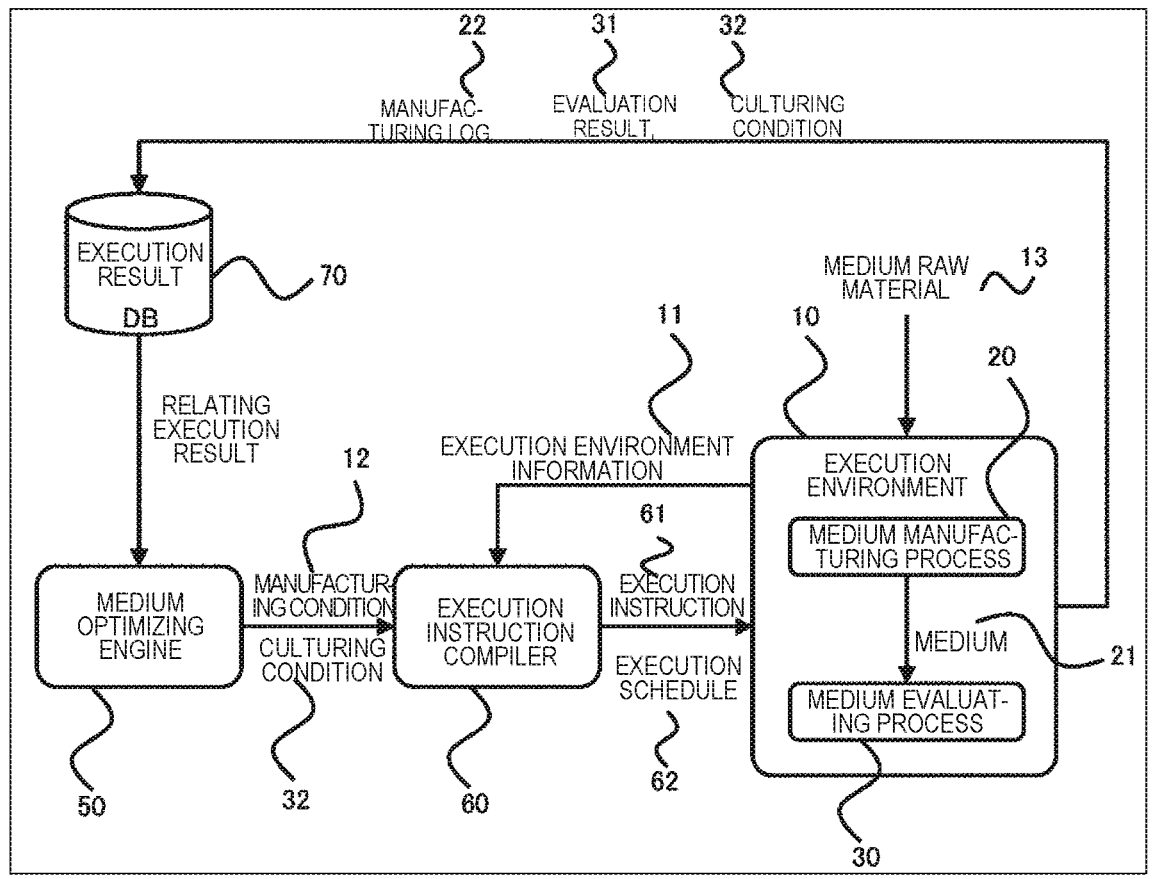
FIG. 1 is a diagram illustrating an entire configuration example of a medium manufacturing system according to an embodiment.

By culturing cells, useful substances are produced, and the cultured cells themselves are made good use in many cases. The cases include, for example, stem cell culture, fermentation food production, pharmaceutical preparation production, edible substance production, and the like. However, a composition of the medium and a production condition of the medium for culturing cells with the highest efficiency are different depending on the type of the cell, a substance that is intended to be generated, and a condition under which the culture is executed. For example, the composition of the medium that maximizes the yield may be different due to a change in the product, a change in the scale, a change in a fungus to be used, and the like. Moreover, the composition of the medium may be different between a case where the yield of the substance is intended to be maximized and a case where the quality of the substance is intended to be maximized. Accordingly, optimal production conditions in the respective cases need to be obtained. As a result, the cost in the search for the production condition is increased. The cost includes the number of times when the search is conducted, and the time cost for conducting the experiment per time.

Therefore, in the present embodiment, by using a past culture result under another condition similar to new culture that is intended to be optimized, the optimization is executed with a small number of trials and with high efficiency. For example, in a case of the optimization in an actual production scale, although performing the search causes such problems that the quality of the product and the production amount, and the like largely vary, by effectively using the result of the search acquired under a condition before the transition of the production scale, it is possible to appropriately design a starting point of the search and reduce the number of trials.

Specifically, in a medium manufacturing system in the present embodiment: when a medium is created and a result thereof is evaluated, based on a manufacturing log of at least one or more types of relating past media and evaluation results thereof, a prediction model for predicting an evaluation result from parameters (feature amounts) included in the manufacturing logs is created; one or more candidates for which parameters are to be used next for preparing and evaluating a medium using the prediction model, and a priority order thereof are determined; the medium is actually adjusted and a performance evaluation of the adjusted medium is then performed; an execution result including an evaluation result acquired by the performance evaluation is recorded; and the execution result is referred when parameters for preparing a next medium are determined. The medium preparing procedure is successively improved in this way, whereby the successive optimization of parameters for preparing a medium can be efficiently performed. The relating past medium includes a medium in which at least any one among a culturing condition related to the culture, an evaluation index of the culture, and a manufacturing condition of the medium manufacturing is different. In a case where a plurality of relating past media are used, a medium in which all of the culturing condition related to the culture, the evaluation index of the culture, and the manufacturing condition of the medium manufacturing are the same may be included. For example, in a case where degrees of differences in the culturing condition and the manufacturing condition are evaluated, a medium in which the degrees are equal to or less than predetermined thresholds may be specified as a relating past medium. The manufacturing condition includes the component of a medium, an execution procedure, input/output to each procedure, an operation that is performed in each procedure, a parameter (including a constraint condition) related to the operation, and a parameter value to be set to the parameter, and the like, which are necessary for the execution of the operations of the overall manufacturing process of the medium. The culturing condition includes an object (a substance, a living thing, or the like) to be cultured, a procedure of the culture, input/output to each procedure, an operation that is performed in each procedure, a parameter (including a constraint condition) related to the operation, and a parameter value to be set to the parameter, and the like.

The manufacturing log includes a manufacturing condition used in the manufacturing process of the medium. In the performance evaluation of the medium, a result obtained by performing a performance test (for example, a cell culture test, a product test, and the like) using the prepared medium may be evaluated in accordance with the evaluation index, or a performance evaluation with no culture may be performed. The performance evaluation with no culture includes, for example, an appearance (a color tone and a medium shape, no foreign matter being mixed, and the like are checked. an absorption spectrometer, a color-difference meter, and the like are used in accordance with the type of the raw material and the type of the medium.), a dissolved state (the solubility and the color tone in accordance with the use method are checked, for example.), the water content (the water content can be measured by an infrared moisture analyzer (Kett-type).), a pH (for example, the pH is measured by a glass electrode method. an agar medium is measured by being diluted 5 times with distilled water, and a bouillon medium is measured with no dilution.), the jelly strength (which is conducted only on the agar medium. a medium is formed in accordance with the use method, and for example, the jelly strength can be measured by a rheometer.), a culturing ability (the Miles and Misra method, a pour method, a turbidity method, or the like), and the like.

First Embodiment

In a medium manufacturing system according to a first embodiment, under a fixed evaluating process, the optimization related to manufacturing of a medium is performed.
<System Configuration>

As illustrated in FIG. 1, a production system according to one embodiment of the present invention includes six components of an execution environment 10, a medium manufacturing process 20, a medium evaluating process 30, a medium optimizing engine 50, an execution instruction compiler 60, and an execution result DB 70. The execution instruction compiler 60 can be omitted.

The execution environment 10 is an aggregate of a culture device, a human being, a transport device, a measurement device, and the like for executing the medium manufacturing process and the medium evaluating process 30. The execution environment 10 includes one or more actuators, one or more objects, and the like. The execution environment 10 corresponds to, for example, a factory, a laboratory, a kitchen, a workshop, or the like.

The medium manufacturing process 20 is an aggregate of operations and calculations for performing an operation necessary for medium manufacturing on the execution environment 10, and uses a medium raw material 12 and a manufacturing condition 13 as inputs to manufacture a medium 21, and outputs a manufacturing log 22 related to the manufacturing of the medium 21. The manufacturing condition 13 is created by the medium optimizing engine 50, and is provided to the execution environment 10 by the execution instruction compiler 60, as an execution instruction 61.

The medium evaluating process 30 uses a culturing condition 32 and the medium 21 as inputs, and performs an evaluation of the medium (for example, a culture test, a product test, and the like) using a procedure in accordance with the culturing condition 32, and outputs an acquired evaluation result 31.

A main object of the present invention is to obtain the manufacturing condition 13 that is an execution condition of the medium manufacturing process 20 so as to optimize the evaluation result 31 by trial and error.

Figure 2:
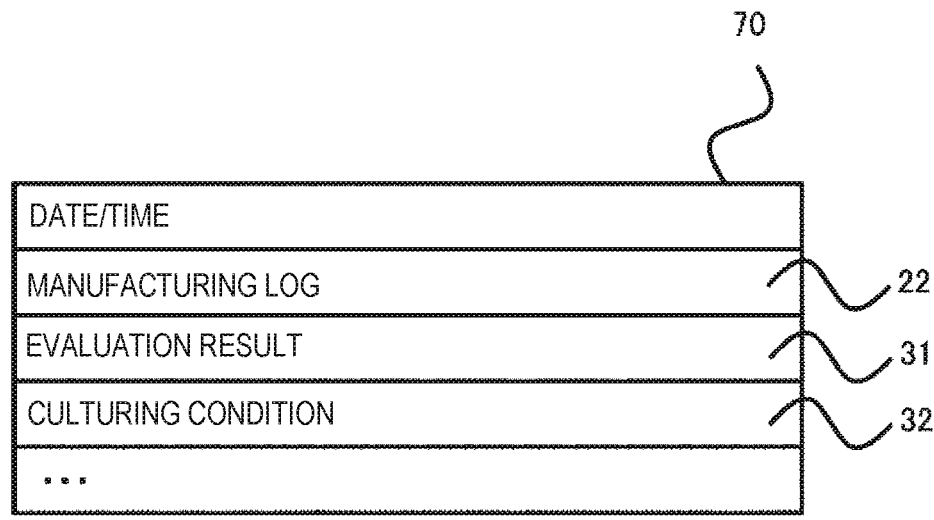
FIG. 2 is a diagram illustrating one example of an execution result stored in an execution result DB 70.

The execution result DB 70 stores execution results of the medium manufacturing process 20 and the medium evaluating process 30 executed in the execution environment 10. FIG. 2 is a diagram illustrating one example of an execution result stored in the execution result DB 70. As illustrated in the drawing, the execution result includes a date/time, the manufacturing log 22 in the medium manufacturing process 20, and the evaluation result 31 and the culturing condition 32 by the medium evaluating process 30. As mentioned above, the manufacturing log 22 includes a manufacturing condition used in the medium manufacturing process 20. The culturing condition includes an object (a substance, a living thing, or the like) to be cultured, a purpose of the culture, a procedure of the culture, input/output to each procedure, an operation that is performed in each procedure, a parameter (including a constraint condition) related to the operation, and a parameter value to be set to the parameter, and the like.

The execution instruction compiler 60 has a function of automatically generating the execution instruction 61 and an execution schedule 62 necessary for the medium manufacturing based on the manufacturing condition 12, to the execution environment 10.

The medium optimizing engine 50 creates, based on an execution result including one or more types of the related past manufacturing logs 22 stored in the execution result DB 70 (in other words, the past manufacturing log 22 related to the medium in which at least any one among a culturing condition related to the culture, an evaluation index of the culture, and a manufacturing condition of the medium manufacturing is different. In a case where a plurality of the past manufacturing logs 22 are used, the manufacturing log 22 related to a medium in which all of the culturing condition related to the culture, the evaluation index of the culture, and the manufacturing condition of the medium manufacturing are the same may be included) and the evaluation result 31 thereof, a prediction model using parameters (feature amount vector) related to a manufacturing procedure of a medium to be optimized as an explanatory variable, and the evaluation result 31 as an objective variable. In the present embodiment, the prediction model is a probability model in consideration of uncertainty. It is assumed that the probability model is a prediction model in which a random variable in consideration of probability distribution is used for an output (and an input), for example. The medium optimizing engine 50 can calculate, using at least any items of the culturing condition and the manufacturing condition related to a medium to be optimized, and corresponding items of the culturing condition 32 and the manufacturing condition 13 included in the execution result, a distance between these media, and select only the relating past manufacturing log 22 having the distance equal to or less than a predetermined threshold.

The concrete example of the calculation of a distance is as follows, for example.

(1) Between Different Production Substances, Especially Protein

The hydrophobicity (solubility, acid dissociation constant, distribute coefficient, and the like), the molecular weight, the amino acid sequence of the protein can be input. For example, the hydrophobicity of the protein is acquired, and a distance on the hydrophobicity axis can be defined as a "closeness" between two different proteins as an example.

(2) Difference in Environment (Factory), Scale-Up

A distance index can be set based on specifications (the tank scale, the tank specific heat, the size of a propeller for mixing, the outside air temperature, the humidity, and the like) of the facility for performing the medium manufacturing. For example, as for one index of the tank specific heat, by acquiring information on a tank as a target, based on the axis of the tank specific heat, a closeness of the culturing conditions can be determined. Moreover, by simultaneously acquiring information on the outside air temperature, the input heat quantity necessary for keeping the temperature at a predetermined value can be used as a feature amount.

(3) Difference in Raw Material (for Example, when a Sugar Source has Changed, when a Water Source has Changed, and the Like)

The culture is performed in different countries and environments to generally cause the difference in the quality of the raw material of the culture. For example, in a Thailand area, cassava syrup and sugarcane molasses are used as sugar sources of the large-scale culture, whereas in the North America area, cone syrup is generally used as a sugar source. The composition of the same item differs depending on the place of production. In addition, water in the water source is soft water in a country like Japan, whereas water in the water source is hard water containing many minerals in a country like United Kingdom. After the components of the raw materials are acquired by a measurement method such as mass spectrometry, a function indicating the closeness (the ratio of sucrose per weight, the ratio of impurity, the content rate of mineral per weight, or the like) can be configured from a result thereof.

(4) Combination of Abovementioned Plurality of Indexes

For example, a plurality of different feature amounts such as the hydrophobicity, the tank specific heat, and the water hardness in which the validity has been confirmed are taken out, and a distance in a space in which those feature amounts are combined can be also measured. For example, the closeness can be measured by Euclid distance.

The medium optimizing engine 50 performs conversion of extracting one or more types of feature amounts based on a given feature extraction rule, from the manufacturing logs 22 and the evaluation results 31 of one or more types of relating media in the past. In a case where structures of one manufacturing condition and another manufacturing condition are different from each other and other cases, the medium optimizing engine 50 can design a suitable correspondence between the both manufacturing conditions. As for execution results in which at least either one of the culturing condition and the manufacturing condition is different, a feature amount conversion function is designed in the form of combining at least one matrix calculation and at least one linear or non-linear conversion between the both execution parameter values, whereby the correspondence between the both conditions can be taken. The abovementioned feature amount conversion function itself may be changeable by successive optimization.

The medium optimizing engine 50 can effectively perform the selection of a variable parameter and the setting of a search range by being appropriately used, for example, by analyzing which factor in the manufacturing condition or the culturing condition contributes most about the improvement in the evaluation result by using the feature amount or the prior knowledge of a user. The medium optimizing engine 50 can effectively perform the generation of a search point by appropriately using a feature amount extraction system, for example, by projecting a past execution result 21 on a search space, or limiting search range by adding some sort of conversion on one or more variables in the search space.

In the present embodiment, the medium optimizing engine 50 generates, based on one or more types of the relating past execution results 21 stored in the execution result DB 70 or a feature amount generated based thereon, a regression model (response curved surface) related to an evaluation result on the search range or some sort of feature amount. For the generation of a regression model, for example, a Gaussian process, a neural network, a Bayesian neural network, Fandom Forest regression, Tree Structured Paizen Estimator, a multi-task Gaussian process, and the like can be used. When a search point is generated, the medium optimizing engine 50 can create the search point by using the regression model generated herein. For the generation of a search point by using the regression model, a method (a maximizing method of an acquired value function) of the Bayesian optimization and the multi-task Bayesian optimization can be used. In the present embodiment, the search is performed by generating a plurality of search points in order to determine an optimal (maximization of the evaluation result 31) parameter value, however, one or more search points may be determined as optimal parameter values by using a probability model.

The execution instruction compiler 60 has a function of automatically generating an execution instruction and an execution schedule necessary for the manufacturing of a medium and execution of culture using the medium, based on information on the manufacturing condition 13 and the culturing condition 32, to the execution environment 10. Information (execution environment information 11) on the execution environment 10 is provided from the execution environment 10 to the execution instruction compiler 60. The execution environment information 11 is data sufficient to uniquely specify data related to execution of the process in the inside states of the medium manufacturing process 20 and the medium evaluating process 30, and can be used for the generation of an execution schedule by specifying an actuator that can be executed currently to each operation and estimating the execution of the operation, from an exclusive state of resources and the type of the actuator. The execution environment information 11 includes at least information on the number, the type, the arrangement, the state, and the like of each actuator and object.

<Processing>

Figure 3:
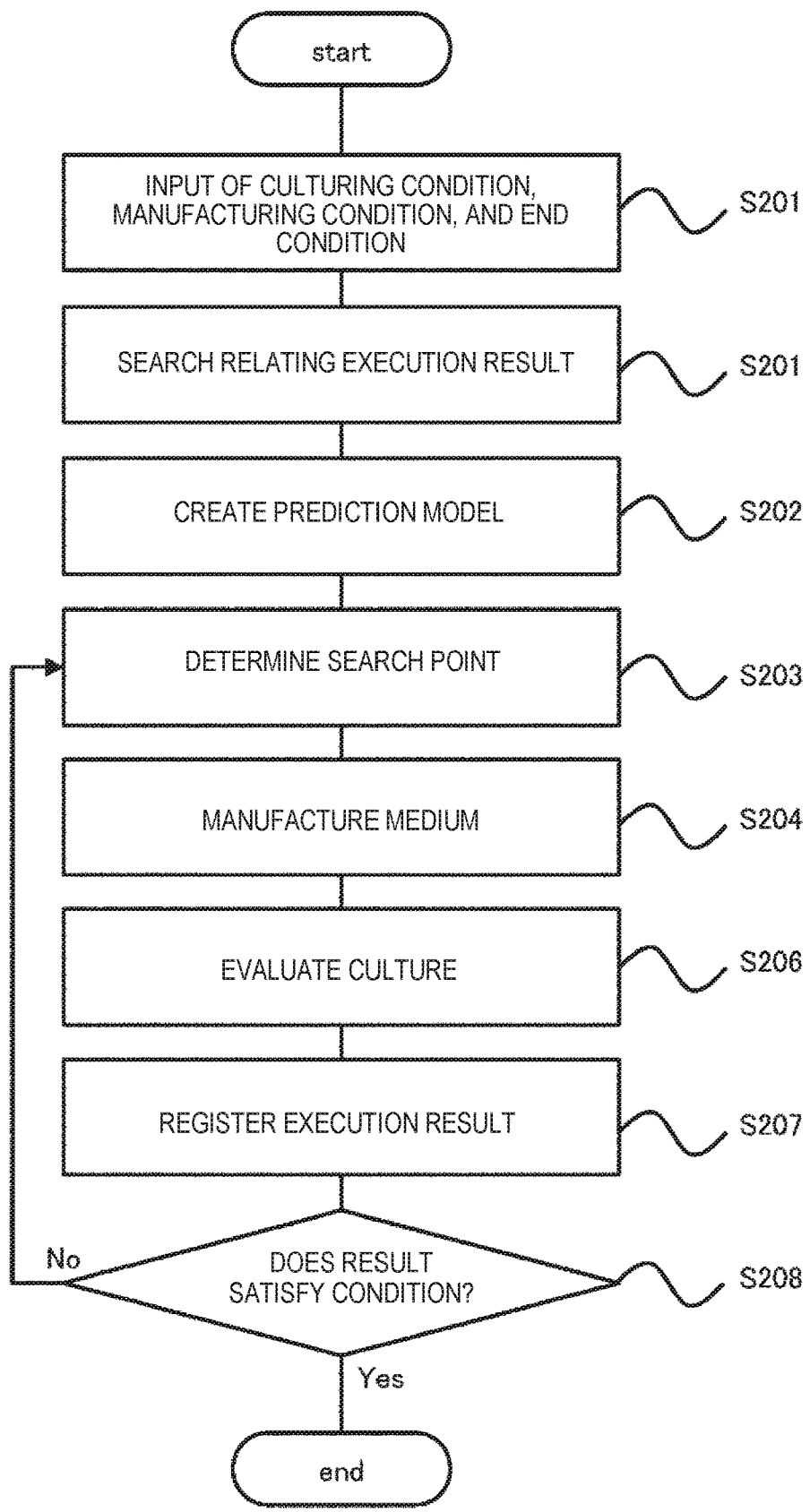
FIG. 3 is a flowchart illustrating a flow of entire processing of the medium manufacturing system in the present embodiment.

FIG. 3 is a flowchart illustrating a flow of entire processing of the medium manufacturing system in the present embodiment.

The medium optimizing engine 50 receives input of a culturing condition, a manufacturing condition, and an end condition of the processing (S201). The input can be received from an operator, for example. The culturing condition and the manufacturing condition to be received herein do not need include parameter values for all the parameters, and may include a parameter value to be fixed, for example.

The medium optimizing engine 50 searches an execution result (plurality is possible) related to the input culturing condition and manufacturing condition from the execution result DB 70 (S202). As for whether the execution result is related, as mentioned above, it is possible to calculate, by using at least any item of the input culturing condition and manufacturing condition and a corresponding item of the culturing condition 32 and the manufacturing condition 13 included in the execution result, a distance between these, and select the execution result having the distance equal to or less than a predetermined threshold.

The medium optimizing engine 50 creates a prediction model by using a manufacturing log and an evaluation result included in the searched execution result (S203). The creation of the prediction model can be performed by Gaussian process fitting, for example. In the creation of the prediction model, an input of a model deductively determined by reference to the manufacturing log and the evaluation result may be received. The medium optimizing engine 50 determines a value (search point) to be set using the prediction model, for a variable parameter among the parameters in the manufacturing condition (S203).

The medium manufacturing process 20 creates a medium based on the manufacturing condition in which the search point has been set (S204), and the medium evaluating process 30 evaluates the created medium (S206).

The medium optimizing engine 50 creates an execution result including a date/time, the manufacturing log 22 in the medium manufacturing process 20, the evaluation result 31 by the medium evaluating process 30, and the culturing condition 32, and registers the execution result in the execution result DB 70 (S207).

The medium optimizing engine 50 repeats the processing from Step 203 if the evaluation result 31 does not satisfy the end condition (S208: No), and ends the processing if the evaluation result satisfies the end condition 13 (S208: No).

<Hardware Configuration>

Figure 4:
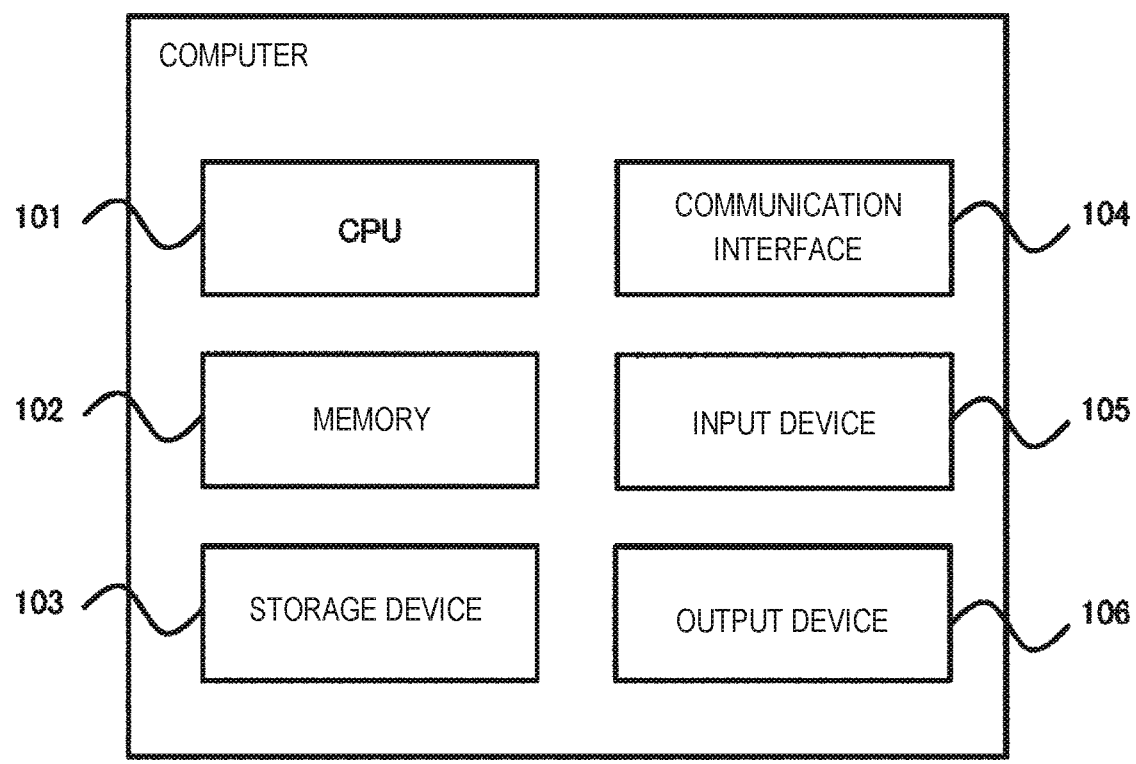
FIG. 4 is a diagram illustrating a hardware configuration example of a computer that implements the medium manufacturing system in the present embodiment.

FIG. 4 is a diagram illustrating a hardware configuration example of a computer that implements the medium manufacturing system in the present embodiment. The computer is provided with a CPU 101, a memory 102, a storage device 103, a communication interface 104, an input device 105, and an output device 106. The storage device 103 stores various kinds of data and programs, and is, for example, a hard disk drive, a solid-state drive, a flash memory, or the like. The communication interface 104 is an interface for connecting to a communication network, and is, for example, an adapter for connecting to the Ethernet (registered trademark), a modem for connecting to public telephone networks, a wireless communication device for performing wireless communication, a universal serial bus (USB) connector and an RS232C connector for serial communication, or the like. The input device 105 is, for example, a key board, a mouse, a touch panel, a button, a microphone, or the like that inputs data. The output device 106 is, for example, a display, a printer, a speaker, or the like that outputs data.

All or apart of the execution environment 10, the medium manufacturing process 20, the medium evaluating process 30, the medium optimizing engine 50, and the execution instruction compiler 60 that are included in the medium manufacturing system according to the present embodiment is implemented such that the CPU 101 reads and executes a program stored in the storage device 103 on the memory 102, and the execution result DB 70 is implemented as apart of a memory area that is provided by the memory 102 and the storage device 103.

Example 1

The following indicates an example according to the present embodiment.

This example 1 defines how to calculate an index (evaluation value) that is intended to be optimized from the evaluation result.

Evaluation index: the amount of protein P that can be harvested per culture solution unit volume Purpose of the optimization: maximizing of the above-mentioned evaluation index Manufacturing condition and culturing condition serving as the starting point of the search:

1. Medium Manufacturing Process
    1.1. Operation: each component is dissolved by being stirred and mixed in the purified water in accordance with the compounding in Table 1-2.
        INPUT: each component (Table 1-2)
        OUTPUT: medium
        Parameters: stirring speed=300 rpm, stirring time=30 minutes, medium amount=80000 L
    1.2. Operation: sterilization is performed using an autoclave.
        INPUT: medium
        OUTPUT: (sterilized) medium
        Parameters: sterilization temperature=120° C., sterilization time=100 minutes
    1.3. Operation: pH is adjusted using a caustic soda aqueous solution.
        INPUT: (sterilized) medium
        OUTPUT: (pH-adjusted) medium
        Parameter: target pH=6.9
2. Medium Evaluating Process
    2.1. Operation: bacteria are cultured using the medium manufactured in the production process (a culture tank of 10 L)
        INPUT: bacterium, medium
        OUTPUT: bacterium, medium
        Parameters: bacterial strain=*Escherichia coli* BB4, culture time=10 hours, culture temperature=37° C.
    2.2. Operation: expression of the specific protein P is stimulated using IPTG
        INPUT: bacterium, medium
        OUTPUT: bacterium, medium
        Parameters: culture time=20 hours, culture temperature=37° C.
    2.3. Operation: SDS-PAGE is performed to determine the quantity of the production amount of the protein P.
        INPUT: bacterium, medium
        OUTPUT: protein amount

TABLE 1-1

| Parameter | Medium component | Table 1.2 |
|---|---|---|
| Device feature amount | Stirring speed | 300 rpm |
| | Stirring time | 30 minutes |
| | Purified water amount | 80000 L |
| | Target pH | 6.9 |
| | location ID | (1, 0, 0) |
| | Tank size | 100000 L |
| | Propeller size | 300 cm |
| Observation information | Outside air temperature | —° C. |
| | External humidity | —% |

TABLE 1-2

| Medium component | |
|---|---|
| Medium component | Compounding ratio (%) |
| Glucose | 8 |
| Peptone (beef) | 2 |
| Yeast extract | 10 |
| Sodium chloride | 1 |
| Dipotassium hydrogenphosphate | 0.5 |
| Purified water | 78.5 |
| Total | 100 |

Search range: set a variable parameter and a variance range among the set parameters (search range)

Variable parameters: medium component, stirring speed, stirring time

Variance range: Table 2

Template:
1. Medium Manufacturing Process
   1.1. Operation: each component is dissolved by being stirred and mixed in the purified water in accordance with the compounding in Table 2.
      INPUT: each component (Table 2), purified water
      OUTPUT: medium
      Parameter: medium amount=80000 L
      Variable parameter: Table 2
   1.2. Operation: sterilizing using an autoclave.
      INPUT: medium
      OUTPUT: (sterilized) medium
      Parameter: sterilization temperature=120° C., sterilization time=100 minutes
   1.3. Operation: pH is adjusted using a caustic soda aqueous solution.
      INPUT: (sterilized) medium
      OUTPUT: (pH-adjusted) medium
      Parameter: target pH=6.9
2. Medium Evaluating Process
   2.1. Operation: bacteria are cultured using the medium manufactured in the production process (a culture tank of 10 L).
      INPUT: bacterium, medium
      OUTPUT: bacterium, medium
      Parameter: bacterial strain=*Escherichia coli* BB4, culture time=10 hours, culture temperature=37° C.
   2.2. Operation: expression of the specific protein P is stimulated using IPTG.
      INPUT: bacterium, medium
      OUTPUT: bacterium, medium
      Parameter: culture time=20 hours, culture temperature=37° C.
   2.3. Operation: SDS-PAGE is performed to determine the quantity of the production amount of the target protein P.
      INPUT: bacterium, medium
      OUTPUT: protein amount

TABLE 2

| | Search range (* adjustment with the purified water amount so as to attain 100% in total) | |
|---|---|---|
| Parameter attribute | Parameter name | Variance range |
| Medium component | Glucose (compounding ratio %) | 7.5-8.5 |
| | Peptone (compounding ratio %) | 1.8-2.2 |
| | Yeast extract (compounding ratio %) | 9.0-11.0 |
| | Sodium chloride (compounding ratio %) | 0.95-1.05 |
| | Dipotassium hydrogenphosphate (compounding ratio %) | 0.45-0.55 |
| Stirring condition | Stirring speed (rpm) | 250-400 |
| | Stirring time (min) | 27-35 |

Variable Portion
   Parameter (variable parameter): medium component, stirring condition
Fixed Portion
   Parameter (fixed parameter): pH
   Device feature amount: location ID, tank size, propeller size
   Observation information: outside air temperature, external humidity, material pH, hardness of water
Past Execution Result:
   Case 1: manufacturing in factory B
   Number of data: 120
   Example: Table 3-1

TABLE 3-1

| Execution result example in factory B | | |
|---|---|---|
| Parameter | Medium component | Omitted |
| Device feature amount | Stirring speed (rpm) | 290 |
| | Stirring time (min) | 32 |
| | pH | 6.9 |
| | location ID | (0, 1, 0) |
| | Tank size (L) | 120000 |
| | Propeller size (cm) | 310 |
| Observation information | Outside air temperature (° C.) | 20 |
| | External humidity (%) | 50 |
| Evaluation information | Protein productivity (g/L) | 25.3 |
| | pH | 6.9 |

Case 2: manufacturing in factory C
Number of data: 300
Example: Table 3-2

TABLE 3-2

| Execution result example in factory C | | |
|---|---|---|
| Parameter | Medium component | Omitted |
| | Stirring speed (rpm) | 350 |
| | Stirring time (min) | 27 |
| | pH | 6.9 |

TABLE 3-2-continued

Execution result example in factory C

| Parameter | Medium component | Omitted |
|---|---|---|
| Device feature amount | location ID | (0, 0, 1) |
| | Tank size (L) | 80000 |
| | Propeller size (cm) | 280 |
| Observation information | Outside air temperature (° C.) | 35 |
| | External humidity (%) | 80 |
| Evaluation information | Protein productivity (g/L) | 25.1 |
| | pH | 6.9 |

Parameter in which Search Point is Embedded

TABLE 4-1 search point

| Parameter | Medium component | Table 4.2 |
|---|---|---|
| | Stirring speed | 310 rpm |
| | Stirring time | 30.5 minutes |
| | Purified water amount | 80000 L |
| | Target pH | 6.9 |

TABLE 4-2 search query medium component

| Medium component | Compounding ratio (%) |
|---|---|
| Glucose | 8.1 |
| Peptone (beef) | 2 |
| Yeast extract | 10 |
| Sodium chloride | 1 |
| Dipotassium hydrogenphosphate | 0.5 |
| Purified water | 78.4 |
| Total | 100 |

Explanation

As an example of the invention, provided is a case where by using past medium manufacturing parameter values in a plurality of different culture facilities and corresponding evaluation results, an optimal medium manufacturing parameter value in a new culture facility is obtained. It is assumed herein that in order to manufacture a medium X, a new medium factory A is newly constructed in China. An optimal manufacturing parameter value of a medium that can maximize the production efficiency (g/L) of the protein P using the medium X in the medium factory A is desired to be obtained. The search of an optimal manufacturing parameter for the medium X has been finished in the past in a medium factory B present in Thailand and in a medium factory C present in Japan, so that it is desired to determine an optimal manufacturing parameter with high efficiency in the medium factory A by effectively using those findings. Among the medium factories A, B, and C, facility specifications such as the capacitance of the tank for medium manufacturing is different, the procurement source of the raw materials, and the external environment, and the like are also different, so that optimal medium manufacturing parameter values after such differences are included are derived by successive optimizations.

When the manufacturing condition of the medium X is optimized in the medium factory A, an execution protocol candidate that is operated in the medium factory A and serves as a starting point of the search is firstly selected. It is assumed that an execution protocol that serves a starting point of the search as the above is herein selected. In the execution protocol that serves as a starting point of the search, in addition to medium manufacturing parameter values described in the items of parameters in Table 1-1 and Table 1-2, device feature amount values such as the tank size and the propeller size that indicate device characteristics in the medium factory A are described. A described location ID is an one hot vector, which is present for each factory, and can be introduced as a variable for explaining an uncertain element that has been unable to be observed. Next, in the execution results (manufacturing condition and culturing condition) that serve as the starting point of the search, parameters that are intended to be optimized are selected as variable parameters, and variance ranges are respectively set thereto, thereby defining a search range. It is assumed that the search range is herein defined as Table 2. The search range as Table 2 is set for the manufacturing condition and the culturing condition that serve as the starting point of the search is used as a template.

Next, execution results including the manufacturing condition when the medium X was manufactured in the past in the factory B and the factory C and the culturing condition thereof are acquired. The execution result includes, in addition to the parameter value of the execution protocol, the device feature amount, observation information (for example, the outside air temperature, the external humidity, and the like) in the execution, a performance evaluation result of the manufactured medium, and the like. In this case, it is assumed that 120 data values in the factory B and 300 data values in the factory C are respectively acquired. As examples of the acquired data values, the data values in Table 3-1 and Table 3-2 are included. Next, after the abovementioned acquired data values are changed to the vector representation, a regression model is generated on a parameter space (a space including all of the parameters-device feature amounts-observation information). In this case, after all of the data of 120 in the factory B and the data of 300 in the factory C are mapped on the parameter space, Gaussian process regression is performed on the data. Next, based on the acquired abovementioned regression model, search points of a given number are generated within the abovementioned search range. In this case, a partial space that is designated based on the device feature amount of the factory A, and observation information (outside air temperature=27° C., external humidity=65%) acquired by the measurement, within the parameter space, is a search range, so that an acquisition function (Expected Improvement in the present embodiment) is calculated in the search range, and is optimized, whereby one search point as illustrated in Table 4-1 and Table 4-2 was generated. Next, information on the generated search point is written in the template, whereby an execution protocol was generated. Next, in the execution environment 10, the generated execution protocol is executed, whereby an execution result including the abovementioned evaluation result was obtained. If the evaluation result has reached a target value, or a predetermined number of execution times has been reached, the search is ended. If the end condition is not satisfied, the past result including this result is referred to return to the generation of a next execution protocol, and the search is continued.

As in the foregoing, it is possible to create a regression model, based on the manufacturing condition and the evaluation result of the medium manufactured in the past culture under the different condition or manufacturing condition, by the method such as the Bayesian optimization, generate a search point using the acquisition function, and search parameters of a manufacturing condition capable of obtaining a desired (within a range of a target value set in advance) evaluation result, so that it is possible to manufacture a medium capable of obtaining a desired evaluation result using the manufacturing condition.

In the abovementioned example 1, by performing the processing the same as the transition of findings between the factories (in other words, the transition of findings under the condition in which parameters related to the production facilities are different in the manufacturing condition), it is possible to perform transfer learning between medium manufacturing conditions different in bacteria, raw material substances, sugar sources, campaigns, and the like.

When a task having a high optimization cost is intended to be solved, a task having a low optimization cost similar thereto is firstly solved, and the finding thereof is transferred, whereby a target task can be solved.

For example, a case where a medium manufacturing parameter value for large-scale culture of a new animal cell K is obtained is considered. The optimization of the medium manufacturing in a production scale condition increases both the costs (temporally and financially), so that the optimization is performed by firstly performing condition examination of small-scale medium manufacturing having a low execution cost many times, and thereafter performing condition examination in the production scale small number of times, whereby it is possible to reduce the cost for obtaining an optimal manufacturing condition.

For example, task transition X→X' under some sort of a condition is considered. Solving merely and simply this problem is similar to Example 1, meanwhile: a case where such achievements are present that the task transition X→X' was performed in the past under a plurality of conditions is herein considered. In such a case, in a case where task transition X→X' of a certain new culture target is performed, it is possible to efficiently perform the transition from the achievements of the past X→X' (even if the type of a culture target is different).

For example, a case where medium manufacturing parameters for large-scale culture of a production substance P with a new bacterium A is obtained is considered. The past achievement is that medium manufacturing of production substances Q, R, S, and T with a small-scale device was firstly obtained, and based on the findings, execution parameter values for large-scale manufacturing of the production substances Q, R, S, and T were obtained. In such case, it is possible to learn the conversion for the manufacturing scale-up based on the achievements of the production substances Q, R, S, and T, and efficiently perform the scale-up of the production substance P based on the conversion.

A substance present in a culture solution before and after the culture may be analyzed (analyses for which component was consumed, and which component contributed the evaluation value by which degree) using a result obtained by performing the batch culture, and a result thereof may be directly reflected on the medium manufacturing parameter.

Second Embodiment

In the first embodiment, the evaluating process of a medium is fixed, and the manufacturing condition related to the manufacturing of the medium is optimized. In a second embodiment, the culturing condition is optimized together with the manufacturing condition.

Figure 5:
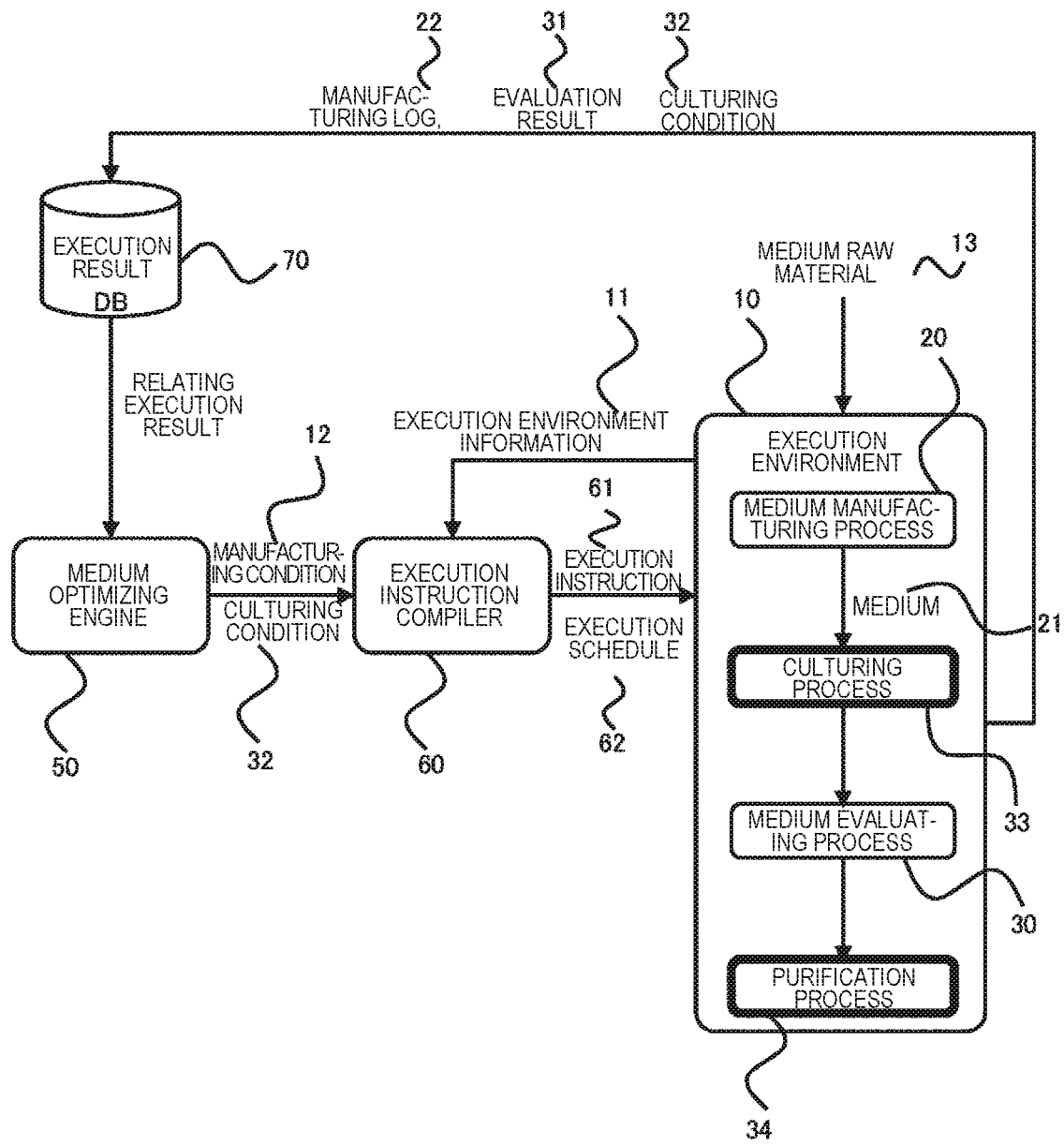
FIG. 5 is a diagram illustrating an entire configuration example of a medium manufacturing system according to a second embodiment.

FIG. 5 is a diagram illustrating an entire configuration example of a medium manufacturing system according to the second embodiment. A medium manufacturing system of the second embodiment is provided with, in addition to the execution environment 10, the medium manufacturing process 20, the medium evaluating process 30, the medium optimizing engine 50, the execution instruction compiler 60, and the execution result DB 70, a culturing process 33 and a purification process 34. The purification process 34 can be omitted.

The culturing process 33 is an aggregate of operations and calculations for performing an operation necessary for cell culturing on the execution environment 10, and outputs a culture result (a culture suspension, and an observation result (a medium composition, a bacterium image)). The purification process 34 performs processing such as the extraction and the purification on a culture result, and outputs a purification result (for example, an isolated cell, isolated protein, an isolated amino acid, and the like), which are products of a series of production processes.

In the second embodiment, the medium evaluating process 30 performs the evaluation to the product and the observation result included in the culture result and the purification result, and outputs the evaluation result 31 (for example, the yield, the quality, the production cost, the electric power consumption, and the like of the product). A main object of the medium manufacturing system according to the second embodiment is to obtain execution conditions of the culturing process 33 and the purification process 34 that optimize the evaluation result 31 by trial and error.

The medium optimizing engine 50 creates a prediction model in which a manufacturing procedure of a medium to be optimized and parameters related to the culturing procedure are used as explanatory variables, and the evaluation result 31 is used as an objective variable, based on the stored one or more types of the relating past execution results (the manufacturing log 22, the evaluation result 31, and the culturing condition 32). Similar to the first embodiment, the medium optimizing engine 50 may calculate, using at least any items of the culturing condition and the manufacturing condition related to a medium to be optimized, and corresponding items of the culturing condition 32 and the manufacturing condition 13 included in the execution result, a distance between these media, and select the abovementioned relating past manufacturing log 22 having the distance equal to or less than a predetermined threshold.

The medium optimizing engine 50 performs conversion of extracting one or more types of feature amounts based on a given feature extraction rule, from the manufacturing logs 22, the culturing conditions 32, and the evaluation results 31 of one or more types of relating media in the past. In the second embodiment, the culturing condition 32 includes an execution procedure related to the purification process 34, an input and output to each procedure, an operation that is performed in each procedure, a parameter (including a constraint condition) related to the operation, and a parameter value to be set to the parameter, and the like.

The medium optimizing engine 50 can set variable parameters to both of a manufacturing procedure and a culturing procedure related to a medium to be optimized, and can determine which parameter value (search point) is next set to the variable parameter, by the Bayesian optimization method, for example.

Also in the second embodiment, the processing illustrated in FIG. 3 is performed, meanwhile: the medium optimizing engine 50 can set variable parameters not only to the manufacturing condition but also to the culturing condition at Step S202, and can search optimal points (the highest evaluation results) by setting variable parameters to both of the manufacturing condition and the culturing condition and changing the values (search points) at Step 203. In the second embodiment, the evaluation index can be also changed. For example, based on an execution result in which maximization of the yield is used as an evaluation index, an optimization of a medium in which an improvement in quality is used as an evaluation index can be also performed. In the second embodiment, between Step S204 and step S206, Step S205 of the culture performed by the culturing process 33 is added.

In the foregoing, the present embodiment has been described, however, the description of the abovementioned embodiment is made for easy understanding of the present invention, and is not for limited interpretation of the present invention. The present invention can be modified and improved without departing from the spirit and scope of the invention, and the present invention includes equivalents thereof.

For example, although the Bayesian optimization is assumed in the present embodiment, for example, an orthogonal table may be used. In addition, in place of the Gaussian process regression, variational autoencoder (VAE), random forest regression, and regression using Tree-structured Parzen Estimator may be performed.

Third Embodiment

Figure 6:
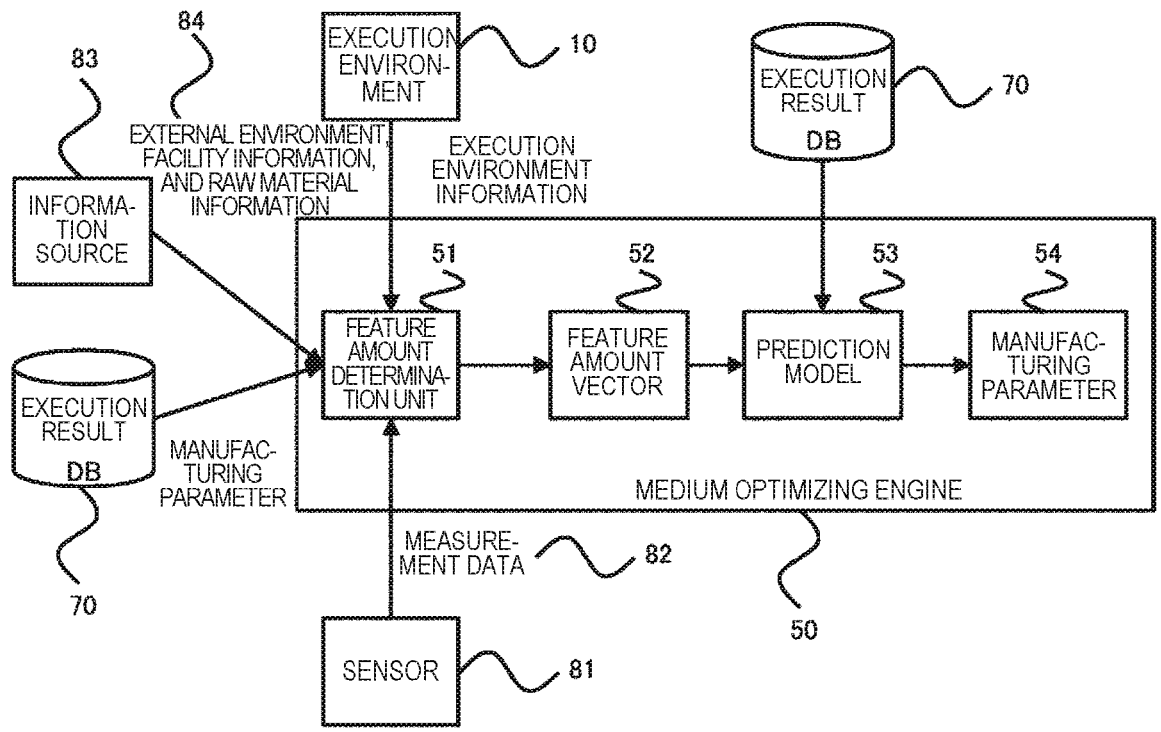
FIG. 6 is a diagram for explaining a medium optimizing engine 50 according to a third embodiment.

In the first embodiment and the second embodiment, a regression model was created based on parameters included in the execution result. In a third embodiment, a prediction model is created using a feature amount vector by including elements that are not included as parameters in the manufacturing procedure conducted in the past. FIG. 6 is a diagram for explaining a medium optimizing engine 50 according to the third embodiment. The medium optimizing engine 50 of the third embodiment is provided with a feature amount determination unit 51, and the feature amount determination unit 51 creates a feature amount vector 52 that is used for creation of a prediction model 53, from information from various kinds of sensors 81 and information sources 83, in addition to the execution result. The feature amount determination unit 51 determines, to a vector having measurement information from the sensor 81 and execution environment information from the execution environment 10 as elements, by a combination of one or more matrix calculations and one or more linear or non-linear conversions, a parameter (feature amount) to be added to the parameters included in the manufacturing procedure, and creates and outputs the feature amount vector 52.

In other words, in the execution environment 10, the sensor 81 measures information other than the parameters described in the manufacturing procedure, measurement values (for example, the successively measured temperature, humidity, raw material composition, and the like) by the sensor 81 and parameters (for example, the type of the raw material, the specification of the device, and the like) obtained in advance are input into the feature amount determination unit 1, and the feature amount determination unit 51 creates the feature amount vector 52 based on the input information. In this manner, a search point of a manufacturing parameter 54 can be obtained by creating the prediction model 53 using the feature amount vectors acquired for each culture and for each environment, so that it is possible to efficiently perform the transition of findings.

The feature amount determination unit 51 can add information 84 from the various kinds of the information sources 83 to the feature amount vector 52. The information from the information sources 83 includes the external environment, information on the facility, and information on the raw material.

The external environment can include, for example, the weather, the air temperature, the humidity, the installation location, and the moon.

The information on the facility can include, for example, the scale of manufacturing, the device configuration, and the installation location.

The use of information on the raw material as a feature amount is effective in a case of the raw materials that can be expressed as the same raw material in the manufacturing procedure but the compositions thereof are different. The information on the raw material can include the component of the raw material, the attribute of the raw material, or information indicating an external environment related to the raw material. The information on the raw material can be measured by a sensor, through chemical processing, sample preparation, observation (X-ray diffraction, mass spectrometry, chromatography, and the like), and the like.

As the type of the raw material, a sugar source, a water source, an N source, various kinds of inorganic salts, a buffer, various kinds of vitamins, serum, hormone, and the like are present.

As the type of the sugar source, cassava, sugarcane molasses, beet sugar, cone, synthetic sugar (pure), and the like can be included. The composition of the sugar source can be expressed as a space that is defined by the concentration of saccharides such as sucrose, glucose, fructose, maltose, fructose, galactose, and the like. In the case of a naturally derived sugar source, potassium ions, sulfuric acid ions, chloride ions, other vitamins, amino acids, various kinds of growth inhibitors, trace components, the water content, and the like, in addition to saccharide, can be included. The information on the sugar source may be provided as information, or may be measured by a sensor through chemical processing, sample preparation, observation (X-ray diffraction, mass spectrometry), and the like.

As information on the water source, the concentration and the total sum of minerals that are contained in the water (the type of metal ions, and the like) in unit volume can be used.

Whether a growth inhibitor is contained in various kinds of raw materials, and the degree of the contained growth inhibitor can be also provided as information. The typical growth inhibitor includes m-methoxyacetophenone, apocynin, furfural, HMF, vanillin, syringaldehyde, and the like, and the concentration or the like of the known growth inhibitor including toxic metals such as mercury, cadmium, and chromium can be provided.

The N source included in various kinds of raw materials can be also used as a feature amount. The N source can include the type of peptone (butcher meat, a cardiac muscle, milk, casein, gelatin, soybeans), the amino acid composition (a basis containing one or more typical amino acids (typical 20+α)), and the like.

The composition of inorganic salts included in various kinds of raw materials can be also used as a feature amount. In a case of a natural medium, in addition to inorganic salts contained in various kinds of raw materials, salts are added for osmotic adjustment and membrane potential control in many cases. The composition of inorganic salts can include ions such as Na, K, Ca, Zu, Fe, Cu, Mn, and Se.

The composition of a vitamin included in various kinds of raw materials can be also used as a feature amount. The composition of the vitamin can include all of the typical various kinds of fat-soluble vitamin groups and water-soluble vitamin groups. In a case of a natural medium, the vitamin is contained in, in addition to extracts, the sugar source and peptone, so that the vitamin is used as a feature amount of the composition thereof, and in a case of a synthetic medium, a vitamin is individually added, and also in the case of the natural medium, a vitamin can be individually added. The type of extracts includes a meat extract, a plant extract, a yeast extract, and the like.

In addition, the composition of various kinds of buffers (can be added for stabilization of PH and thus can be used as a feature amount related to a raw material.); the composition of serum (various kinds of albumin, a growth factor, a cell growth promoting substance, a cell injury protective factor, a nutrition factor, and the like are included. in a case of a serumless medium, protein, peptide, and the like may be added instead.); the composition of protein, peptide, and the like (for example, albumin, transferrin, fibronectin, fetuin, and the like.), the composition of a fatty acid, lipid, and the like (for example, steroids, and the like.); the composition of hormone; and the like can be used as a feature amount.

As an attribute of a raw material, elements such as a lot of the raw material, a campaign, a product source, an extraction source of the raw material, and the like can be used as feature amounts.

The incorporation of the lot into the feature amount can be used for correcting a difference in the raw material or the external environment present between the lots or the campaigns. A feature amount for the raw material is extracted every time when the lot/campaign of the raw material is changed, and a manufacturing parameter can be adjusted based on the information.

As information indicating an external environment related to a raw material, for example, the time (season, month, or the like) when the raw material was prepared or created, the climate in a place where the raw material was prepared or created, and the like can be included.

The information as the above can be added to the feature amount vector as information on the raw material. This can incorporate the element that has not been recognized as a parameter in the manufacturing procedure in the parameter, so that it is possible to appropriately perform knowledge transition.

For example, determination processing of a feature amount is sandwiched between the seed culture and the main culture, whereby a lot-to-lot error can be minimized. When the large-scale culture is performed, the culture is not normally performed suddenly from a large-scale tank. Such a procedure is taken that a culture in a small-scale device is firstly performed, which is called "seed culture", and a result thereof is shifted to the large tank to perform a large-scale culture. In this case, it can be considered that a sampling result in the small-scale culture tank is analyzed by a mass spectrometry or the like, a task feature amount is then extracted, and the parameter of the main culture is changed based on the information, which are effective in many situations.

It is also possible to efficiently perform the optimization of the medium manufacturing by using differently several types of culturing processes, which are a part of the evaluating process.

Firstly, culture is performed by a method, which is called a batch culture, in which a medium is not fed in the culture, and the medium component is analyzed after the culture, whereby it is possible to estimate which component among the initial medium component has been used more and how much a substance that inhibits the growth of the object is discharged. By using the information, in feed culture (the culture form in which a feed medium is gradually added in the middle of the culture) or a continuous culture, it is preferable to appropriately adjust the composition of the initial medium and the composition of the feed medium.

For example, as a result of a medium analysis, if it is determined that the sugar source is insufficient, the amount of the sugar source in the initial medium or the feed medium is increased. If it is determined that the acidity becomes too high in the middle of the culture, such a changed is made that the amount of buffers to be input into the initial medium is increased and alkaline (carbon dioxide hydrogen Na and the like) is added to the feed medium. In a case where the growth inhibition factor is excessively increased in the medium, a better medium composition can be efficiently obtained by reflecting a change corresponding to the matter, such as addition of a component that cancels the excessive increase to the medium on the manufacturing parameter.

The present invention can be provided with the configurations as follows.

[Item 1] (Medium Manufacturing Using Another Medium Composition as Starting Point)

A manufacturing method of a medium, the medium manufacturing method comprising:

a step of creating a prediction model based on values of parameters related to manufacturing of another medium manufactured in the past and being different in at least any one among an object of culture, an index of the culture, and a manufacturing condition of the medium manufacturing;

a step of creating a value of the parameter using the prediction model; and a step of manufacturing the medium using the created value of the parameter.

[Item 2] (Regression Model)

The medium manufacturing method according to Item 1, wherein at the step of creating the prediction model, a regression model is created based on the value of the parameter.

[Item 3] (Determination of Parameter to be Optimized, Generation of Query within Range Thereof.+Evaluation of Medium Manufacturing Condition by Culture)

The medium manufacturing method according to Item 1, further comprising:

a step of acquiring at least one manufacturing procedure that is included in the manufacturing condition related to the manufacturing of the another medium;

a step of determining a parameter to be variable in the parameters related to the manufacturing procedure;

a step of setting a search range of the determined parameter to be variable; and a step of evaluating the manufactured medium, wherein at the step of creating the value of the parameter, as for the parameter to be variable, the value within the search range is determined based on the prediction model.

[Item 4]

The medium manufacturing method according to Item 3, wherein the step of evaluating the medium includes a step of performing culture using the manufactured medium, and a step of evaluating a result of the culture.

[Item 5] (Probability Model)

The medium manufacturing method according to Item 1, wherein at the step of creating the prediction model, a probability model of a regression function is created as the prediction model.

[Item 6] (Mapping by Conversion-Based Design)

The medium manufacturing method according to Item 3, further comprising a step of converting, when the first parameter related to the manufacturing procedure of the another medium is different in type from the second parameter related to the manufacturing procedure, by using a function of converting a value of the first parameter to a value of the second parameter, the value of the first parameter determined based on the prediction model.

[Item 7] (Search by Successive Optimization is Repeated Until End Condition is Satisfied)

The medium manufacturing method according to Item 3, wherein until an evaluation result obtained by evaluating the medium satisfies a predetermined condition, by setting one or more values within the search range relative to the parameter to be variable, the step of creating the value of the parameter, the step of manufacturing the medium, the step of performing the culture, and the step of evaluating the result of the culture are repeated.

[Item 8] (Output Optimal Protocol from Past Experiment Data)

The medium manufacturing method according to Item 3, wherein based on the value of the parameter in which the evaluation result obtained from the evaluation of the medium satisfies the predetermined condition, the value of the parameter to be set to the manufacturing procedure is determined.

[Item 9] (Output Optimal Protocol from Past Experiment Data)

The medium manufacturing method according to Item 3, further comprising a step of outputting the manufacturing procedure in which the value is set to the parameter, when the evaluation result obtained from the evaluation of the medium satisfies the predetermined condition.

[Item 10] (Starting Point is Determined by Sandwiching at Least One Experiment)

The medium manufacturing method according to Item 3, wherein at the step of acquiring at least one manufacturing procedure, a plurality of the manufacturing procedures are acquired, the medium manufacturing method further comprising:
  a step of test manufacturing the media using the respective manufacturing procedures;
  a step of evaluating the test manufactured media; and
  a step of selecting at least one manufacturing procedure in accordance with evaluation results of the test manufactured media, wherein
  the parameter to be variable is determined relative to the selected manufacturing procedure.

[Item 11]

The medium manufacturing method according to Item 3, wherein
  at the step of acquiring at least one manufacturing procedure,
  a step of calculating a distance between the manufacturing condition that is used for the manufacturing of the medium and the manufacturing condition related to the another medium, and
  a step of determining at least one manufacturing procedure in accordance with the distance, are executed.

[Item 12] (Execution Example Under Same Condition is Used as Starting Point)

The medium manufacturing method according to Item 3, wherein at the step of acquiring at least one manufacturing procedure, the manufacturing procedure of the another medium under a manufacturing condition the same as a planned manufacturing condition is acquired.

[Item 13] (Regression from Parameter Value of Different Protocol with Close Distance)

The medium manufacturing method according to Item 1, further comprising a step of creating a function to calculate a distance between the another medium and the medium, by a combination of one or more matrix calculations and one or more linear or non-linear conversions on a first vector having the first parameter related to the manufacturing of the another medium as an element and a second vector having the second parameter that is used in the manufacturing of the medium as an element, and acquiring a value of the first parameter related to the manufacturing of the other media of a predetermined number in the order from the closest distance that is calculated by the created function.

[Item 14] (Determination by Sandwiching Experiment)

The medium manufacturing method according to Item 1, further comprising:
  a step of manufacturing an evaluation medium of each of the plurality of the other media using the acquired value of the parameter, and acquiring an evaluation result of the manufactured evaluation medium; and
  a step of acquiring a value of the parameter related to a second another medium experimentally manufactured in relation to a first another medium that is at least one another medium selected in accordance with the evaluation result, wherein
  at the step of creating the prediction model, the prediction model is created based on the value of the parameter related to the manufacturing of the first another medium and the value of the parameter related to the second another medium.

[Item 15] (Determination of Final Parameter from Evaluation of Test Culture)

The medium manufacturing method according to Item 1, wherein
  the step of creating the value of the parameter includes
  a step of creating a plurality of sets of values of the parameters using the prediction model,
  a step of manufacturing an evaluation medium of each of the sets using the value of the parameter included in each of the sets, and acquiring an evaluation result of the manufactured evaluation medium, and
  a step of determining the value of the parameter included in one of the sets in accordance with the evaluation results, as a value of the parameter that is created by the step of creating a value of the parameter.

[Item 16] (Limited Enumeration of Component Parameter)

The medium manufacturing method according to Item 15, wherein at the step of creating the plurality of the sets of the values of the parameters, a set of the values of the parameters in which at least any one or more types among a type and an amount of a C source, a type and an amount of an N source, types and amounts of various kinds of amino acids, a type and an amount of a P source, types and amounts of various kinds of inorganic salts, types and amounts of various kinds of vitamins, a type and an amount of a biological extract, a type and an amount of a hormone, a type and an amount of a growth factor, and a type and an amount of a buffer are changed is created.

[Item 17] (Limited Enumeration of Medium Manufacturing Parameter)

The medium manufacturing method according to Item 15, wherein the set of the value of the parameter in which any one or more types among a raw material input order, a temperature, a stirring speed, and stirring time are changed is created.

[Item 18] (Evaluation Index of Medium)

The medium manufacturing method according to Item 15, wherein the step of acquiring the evaluation result of the medium further includes a step of performing culture using the manufactured medium, and a step of performing an evaluation of the culture in accordance with:

a high production amount of a substance to be the object of the culture or low dispersion of the production amount;

high quality of the substance to be the object of the culture or low dispersion of the quality;

a low cost on production of the substance to be the object of the culture;

a high yield of cells to be the object of the culture or low dispersion of the yield; or high quality of the cells to be the object of the culture or low dispersion of the quality.

[Item 19] (Addition of Measurement Information on Sensor to Feature Amount Vector)

The medium manufacturing method according to Item 1, wherein at the step of creating the prediction model, the prediction model is created based on the known first value of the parameter when the another medium is manufactured and a measurement value measured by a sensor when the another medium is manufactured in a medium manufacturing environment.

[Item 20] (Scale-Up/Environment Difference=Attribute Facility is Included in Feature Amount Vector)

The medium manufacturing method according to Item 1, wherein at the step of creating the prediction model, the prediction model is created by including an attribute of a manufacturing facility used in the manufacturing of the another medium in the parameter.

[Item 21] (Raw Material Difference)

The medium manufacturing method according to Item 1, wherein at the step of creating the prediction model, the parameter related to the manufacturing of the another medium includes a raw material of the medium, and the prediction model is created by including one or more attributes related to the raw material in the parameter.

[Item 22] (External Environment Related to Raw Material)

The medium manufacturing method according to Item 21, wherein at the step of creating the prediction model, the prediction model is created by including an element indicating an external environment related to the raw material in the parameter.

[Item 23] (Lot Difference)

The medium manufacturing method according to Item 21, wherein at the step of creating the prediction model, the prediction model is created by including at least any one among a lot of the raw material, a campaign, a product source, or an extraction source of the raw material, in the parameter.

[Item 24] (Optimization of Medium+Culture)

The medium manufacturing method according to Item 15, wherein at the step of creating the prediction model, the prediction model is created based on a manufacturing parameter value that is a value of a parameter related to the manufacturing and a culture parameter value that is a value of a parameter related to the culture, and at the step of acquiring the evaluation result, the culture is performed by using the value of the parameter created using the prediction model.

[Item 25] (Parameter Setting Using Another Medium Composition as Starting Point)

A method of determining a value of a parameter related to manufacturing of a medium, the medium manufacturing parameter determination method comprising:

a step of creating a prediction model based on values of parameters related to manufacturing of a plurality of other media manufactured in the past and being different in at least any one among an object of culture, an index of the culture, and a manufacturing condition of the medium manufacturing;

a step of creating a value of the parameter using the prediction model; and a step of determining the created value of the parameter as a value of the parameter that is used for the manufacturing of the medium.

[Item 26] (Determination of Final Parameter from Evaluation of Test Culture)

The medium manufacturing parameter determination method according to Item 25, wherein the step of creating the value of the parameter includes a step of creating a plurality of sets of values of the parameters using the prediction model, a step of manufacturing an evaluation medium of each of the sets using the value of the parameter included in each of the sets, performing culture using the manufactured evaluation medium, and acquiring an evaluation result of the culture, and a step of determining the value of the parameter included in one of the sets selected in accordance with the evaluation results, as a value of the parameter that is created by the step of creating a value of the parameter.

[Item 27] (Medium 1)

A medium created by the medium manufacturing method according to Item 1.

[Item 28] (Medium 2)

A medium manufactured by using the parameter value determined by the medium manufacturing parameter determination method according to Item 25.

[Item 29]

A program for determining a value of a parameter related to manufacturing of a medium, the program causes a computer to execute:

a step of creating a prediction model based on the values of the parameters related to manufacturing of a plurality of other media manufactured in the past and being different in at least any one among an object of culture, an index of the culture, and a manufacturing condition of the medium manufacturing;

a step of creating a value of the parameter using the prediction model; and a step of determining the created value of the parameter as a value of the parameter that is used for the manufacturing of the medium.

REFERENCE SIGNS LIST

10: execution environment
11: execution environment information
12: manufacturing condition
20: medium manufacturing process
21: execution result
22: manufacturing log
30: medium evaluating process
31: evaluation result
32: culturing condition
33: culturing process
34: purification process
50: medium optimizing engine
60: execution instruction compiler
61: execution instruction
62: execution schedule
70: execution result DB

The invention claimed is:

1. A medium manufacturing method of a medium, the medium manufacturing method comprising:
acquiring at least one manufacturing procedure that is included in a manufacturing condition related to a manufacturing procedure of another medium manufactured in past that is different in at least one of an object of culture, an index of the culture, and the manufacturing condition of the medium manufacturing;
determining a parameter to be variable in the parameters related to the manufacturing procedure of the another medium;
defining and setting a search range of the determined parameter to be variable by setting variance range;
creating a prediction model based on values of parameters related to the manufacturing procedure of the another medium;
creating a value of the parameter using the prediction model;
of manufacturing the medium using the created value of the parameter; and
evaluating the manufactured medium, wherein
at the creating the value of the parameter, as for the parameter to be variable, the value within the search range is determined based on the prediction model.

2. The medium manufacturing method according to claim 1, wherein
at the creating the prediction model, a regression model is created based on the value of the parameter.

3. The medium manufacturing method according to claim 1, wherein
the evaluating the medium includes:
performing culture using the manufactured medium; and
evaluating a result of the culture.

4. The medium manufacturing method according to claim 3, wherein until an evaluation result obtained by evaluating the medium satisfies a predetermined condition, by setting one or more values within the search range relative to the parameter to be variable, the creating the value of the parameter, the manufacturing the medium, the performing the culture, and the evaluating the result of the culture are repeated.

5. The medium manufacturing method according to claim 4, wherein based on the value of the parameter in which evaluation result obtained from the evaluating of the medium satisfies the predetermined condition, the value of the parameter to be set to the manufacturing procedure is determined.

6. The medium manufacturing method according to claim 4, further comprising outputting the manufacturing procedure in which the value is set to the parameter, when the evaluation result obtained from the evaluation of the medium satisfies the predetermined condition.

7. The medium manufacturing method according to claim 1, wherein
at the creating the prediction model, a probability model of a regression function is created as the prediction model.

8. The medium manufacturing method according to claim 1, further comprising:
converting, when a first parameter related to the manufacturing procedure of the another medium is different in type from a second parameter related to the manufacturing procedure, by using a function of converting a value of the first parameter to a value of the second parameter, the value of the first parameter determined based on the prediction model.

9. The medium manufacturing method according to claim 1, wherein at the acquiring at least one manufacturing procedure, a plurality of the manufacturing procedures are acquired, the medium manufacturing method further comprising:
test manufacturing a plurality of media using the respective manufacturing procedures;
evaluating the test manufactured media; and
selecting at least one manufacturing procedure in accordance with evaluation results of the test manufactured media,
wherein the parameter to be variable is determined relative to the selected manufacturing procedure.

10. The medium manufacturing method according to claim 1, wherein the manufacturing procedure of the another medium under a manufacturing condition same as a planned manufacturing condition is acquired.

11. The medium manufacturing method according to claim 1, further comprising:
manufacturing an evaluation medium of each of a plurality of other media using the acquired value of the parameter, and acquiring an evaluation result of the manufactured evaluation medium; and
acquiring a value of the parameter related to a second another medium experimentally manufactured in relation to a first another medium that is at least one another medium selected in accordance with the evaluation result, wherein
at the creating the prediction model, the prediction model is created based on the value of the parameter related to the manufacturing of the first another medium and the value of the parameter related to the second another medium.

12. The medium manufacturing method according to claim 1, wherein
the creating the value of the parameter includes
creating a plurality of sets of values of the parameters using the prediction model,
manufacturing an evaluation medium of each of the sets using the value of the parameter included in each of the sets, and acquiring an evaluation result of the manufactured evaluation medium, and
determining the value of the parameter included in one of the sets in accordance with the evaluation results, as a value of the parameter that is created by the creating a value of the parameter.

13. The medium manufacturing method according to claim 12, wherein
at the creating the plurality of the sets of the values of the parameters, a set of the values of the parameters in which at least any one or more types among a type and an amount of a C source, a type and an amount of an N source, types and amounts of various kinds of amino acids, a type and an amount of a P source, types and amounts of various kinds of inorganic salts, types and amounts of various kinds of vitamins, a type and an amount of a biological extract, a type and an amount of a hormone, a type and an amount of a growth factor, and a type and an amount of a buffer are changed is created.

14. The medium manufacturing method according to claim 12, wherein the set of the value of the parameter in which any one or more types among a raw material input order, a temperature, a stirring speed, and stirring time are changed is created.

15. The medium manufacturing method according to claim 12, wherein
at the creating the prediction model, the prediction model is created based on a manufacturing parameter value that is a value of a parameter related to the manufacturing and a culture parameter value that is a value of a parameter related to the culture, and
at the acquiring the evaluation result, the culture is performed by using the value of the parameter created using the prediction model.

16. The medium manufacturing method according to claim 1, wherein at the creating the prediction model, the prediction model is created based on a known first value of the parameter when the another medium is manufactured and a measurement value measured by a sensor when the another medium is manufactured in a medium manufacturing environment.

17. The medium manufacturing method according to claim 1, wherein at the creating the prediction model, the prediction model is created by including an attribute of a manufacturing facility used in the manufacturing of the another medium in the parameter.

18. The medium manufacturing method according to claim 1, wherein at the creating the prediction model, the parameter related to the manufacturing of the another medium includes a raw material of the medium, and the prediction model is created by including one or more attributes related to the raw material in the parameter.

19. The medium manufacturing method according to claim 18, wherein at the creating the prediction model, the prediction model is created by including an element indicating an external environment related to the raw material in the parameter.

20. The medium manufacturing method according to claim 18, wherein at the creating the prediction model, the prediction model is created by including at least any one among a lot of the raw material, a campaign, a product source, or an extraction source of the raw material, in the parameter.

21. A medium created by the medium manufacturing method according to claim 1.

22. A manufacturing method of a medium, the medium manufacturing method comprising:
acquiring at least one manufacturing procedure that is included in a manufacturing condition related to a manufacturing procedure of another medium manufactured in past that is different in at least one of an object of culture, an index of the culture, and a manufacturing condition of the medium manufacturing;
determining a parameter to be variable in the parameters related to the manufacturing procedure;
setting a search range of the determined parameter to be variable;
creating a prediction model based on values of parameters related to the manufacturing procedure of the another medium;
creating a value of the parameter using the prediction model;
manufacturing the medium using the created value of the parameter; and
evaluating the manufactured medium, wherein
in the creating the value of the parameter, as for the parameter to be variable, the value within the search range is determined based on the prediction model, and
the acquiring at least one manufacturing procedure comprises:
calculating a distance between the manufacturing condition that is used for the manufacturing of the medium and the manufacturing condition related to the another medium, and
determining at least one manufacturing procedure in accordance with the distance, are executed.

23. A medium manufacturing method of a medium, the medium manufacturing method comprising:
creating a prediction model based on values of parameters related to manufacturing of another medium manufactured in past that is different in at least one of an object of culture, an index of the culture, and a manufacturing condition of the medium manufacturing;
creating a value of the parameter using the prediction model;
manufacturing the medium using the created value of the parameter; and
creating a function to calculate a distance between the another medium and the medium, by a combination of one or more matrix calculations and one or more linear or non-linear conversions on a first vector having the first parameter related to the manufacturing of the another medium as an element and a second vector having the second parameter that is used in the manufacturing of the medium as an element, and acquiring a value of the first parameter related to the manufacturing of other media of a predetermined number in an order from a closest distance that is calculated by the created function.

24. A medium manufacturing method of a medium, the medium manufacturing method comprising:
creating a prediction model based on values of parameters related to manufacturing of another medium manufactured in past that is different in at least one of an object of culture, an index of the culture, and a manufacturing condition of the medium manufacturing;
creating a value of the parameter using the prediction model; and
manufacturing the medium using the created value of the parameter, wherein
the creating the value of the parameter includes:
creating a plurality of sets of values of the parameters using the prediction model,
manufacturing an evaluation medium of each of the sets using the value of the parameter included in each of the sets, and acquiring an evaluation result of the manufactured evaluation medium, and determining the value of the parameter included in one of the sets in accordance with the evaluation results, as a value of the parameter that is created by the creating a value of the parameter, and the acquiring the evaluation result of the medium further includes:

performing culture using the manufactured medium; and performing an evaluation of the culture in accordance with:

a production amount of a substance to be the object of the culture or dispersion of the production amount;

quality of the substance to be the object of the culture or dispersion of the quality;

a cost on production of the substance to be the object of the culture;

a yield of cells to be the object of the culture or dispersion of the yield; or quality of the cells to be the object of the culture or dispersion of the quality.

\* \* \* \* \*